Figure 1:
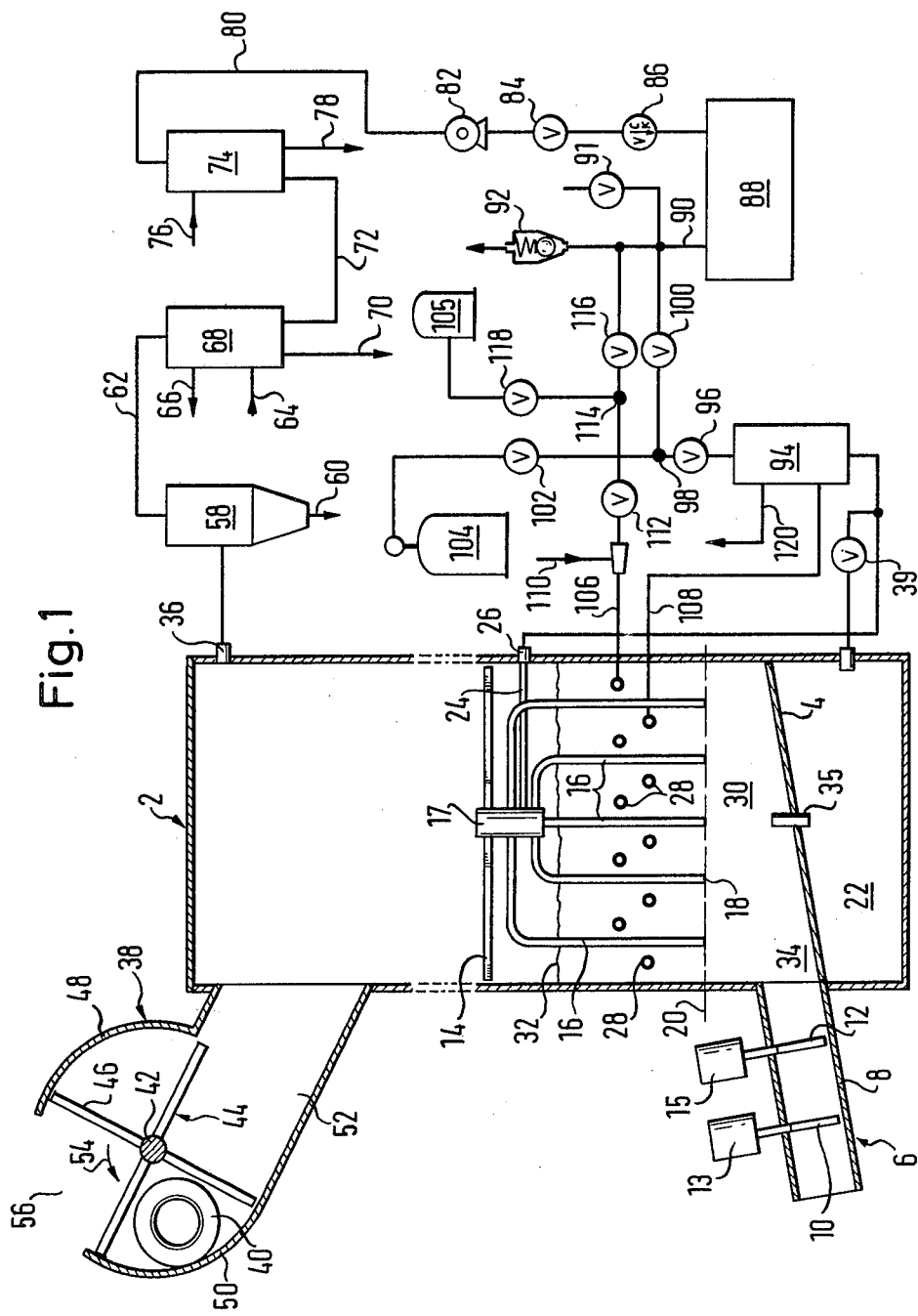

United States Patent [19]

Janning et al.

[11] 4,203,804

[45] May 20, 1980

[54] APPARATUS FOR THE PYROLYSIS OF PIECES OF RUBBER OR LIKE MATERIAL, ESPECIALLY USED MOTOR VEHICLE TIRES

[75] Inventors: Jörg Janning, Hamburg; Walter Kaminsky, Pinneberg; Hansjörg Sinn, Norderstedt; Stanislav Tysarcyk, Hamburg, all of Fed. Rep. of Germany

[73] Assignee: Carl Robert Eckelmann AG, Hamburg, Fed. Rep. of Germany

[21] Appl. No.: 863,294

[22] Filed: Dec. 22, 1977

[30] Foreign Application Priority Data

Dec. 23, 1976 [DE] Fed. Rep. of Germany ....... 2658371

[51] Int. Cl.² .......................... C10B 1/04; C10B 53/00
[52] U.S. Cl. .................................. 202/121; 34/57 A; 110/245; 48/197 R; 201/12; 201/15; 201/25; 201/31; 201/2.5
[58] Field of Search ...................... 201/2.5, 31, 25, 12, 201/15; 34/10, 57 A; 23/284, 288 S; 110/244, 245; 48/197 R; 202/99, 121, 129, 134; 422/139, 143, 145, 146

[56] References Cited

U.S. PATENT DOCUMENTS

| | | | |
|---|---|---|---|
| 2,974,419 | 3/1961 | Hauk et al. ............................... | 34/10 |
| 2,995,426 | 8/1961 | Keith .................................... | 23/284 X |
| 3,081,289 | 3/1963 | Cheney et al. ......................... | 23/284 X |
| 3,101,249 | 8/1963 | Priscu ................................... | 23/284 UX |
| 3,853,498 | 12/1974 | Bailie ................................... | 201/2.5 X |
| 3,877,397 | 4/1975 | Davies et al. ......................... | 110/245 |
| 3,897,546 | 7/1975 | Beranek et al. ...................... | 23/284 X |
| 3,933,445 | 1/1976 | Mueller et al. ...................... | 201/31 X |
| 3,997,407 | 12/1976 | Fujii et al. ............................ | 201/2.5 X |
| 4,029,550 | 6/1977 | Mitsui et al. .......................... | 201/2.5 |
| 4,030,984 | 6/1977 | Chambers ............................. | 201/2.5 X |
| 4,082,615 | 4/1978 | Komuro et al. ...................... | 201/2.5 X |

Primary Examiner—Joseph Scovronek
Assistant Examiner—Roger F. Phillips
Attorney, Agent, or Firm—Beveridge, DeGrandi, Kline & Lunsford

[57] ABSTRACT

A fluidized bed reactor for the pyrolysis of pieces of rubber or the like, especially old tires the reactor comprising a container at the lower part of which there is discharge device for non-volatile pyrolysis products; gas blowing nozzles arranged in a zone above the discharge device for supplying a fluidizing gas and for producing a fluidized bed from material such as sand or alumina added to the reactor; preferably a heating device, especially one comprising heating tubes extending across the container; a gas outlet disposed in the zone above the fluidized bed; and supply means for conveying pieces of material to be pyrolized to the container; this apparatus is characterized by the fact that the gas blowing nozzles are arranged to direct the gas downwardly, that at least one group of nozzles are arranged in a common horizontal plane, and that the material supply device is such that its dimensions are comparable with the cross-sectional surface of the fluidized bed.

20 Claims, 7 Drawing Figures

APPARATUS FOR THE PYROLYSIS OF PIECES OF RUBBER OR LIKE MATERIAL, ESPECIALLY USED MOTOR VEHICLE TIRES

The invention relates to a method of and apparatus for the pyrolysis of pieces of rubber or like material, particularly used motor vehicle tires.

Unwanted rubber material, particularly used tires, accumulates in very large quantities, for example, in West Germany alone more than 300,000 tonnes of old tires are available annually at the present time. It is already known to process such waste, particularly used tires, by thermal decomposition (pyrolysis) into products which find particular use as raw materials in the chemical industry. The heating can either be direct (by flames in a reaction chamber) or indirect. Particularly valuable products can be obtained in the case of indirect heating and the pyrolysis is more easily controlled. Known methods of this kind use reactors of the type including indirectly-heated rotary kilns or fluidised bed reactors with layers of fluidised sand; such known methods and types of apparatus are described for example in "Chemie-Ingenieur-Technik" 46 (1974), 579.

For example, in the pyrolysis of pulverised tires in layers of hot fluidised sand, a whole series of valuable pyrolysis products are obtained;

1. A gaseous fraction which is non-condensable at room temperature and which generally comprises $CH_4$, $C_2H_4$, further hydrocarbons and some hydrogen. The energy (heating) necessary for this process can be obtained by the combustion of a part of these gaseous pyrolysis products.
2. An oily fraction, which contains sulphur, is rich in aromatic products and is only slightly de-oxidised, which can be further processed by known methods to produce chemical raw materials.
3. Solids fractions, which can be separated comparatively easily into the individual constituents, such as carbon black, zinc oxide and other valuable fillers.
4. Metallic fractions which in the case of the pyrolysis of old tires originates substantially from the metal inserts in the tire carcasses (braced-tread tires). Since the pyrolysis produces reducing conditions in the reaction chamber, the metals are yielded in reduced form with bright surfaces. Because a comparatively uniform range of types of metal and metal alloys is concerned, an especially high-value output of scrap metal is obtained.

Of the above-named constituents or fractions, the metallic constituents collect at the bottom of the fluidised bed reactor, whereas the other constituents 1 to 3 are carried out of the fluidised bed reactor in a gas stream. Entrained solids can be separated from the gas stream in a hot cyclone and constituents 1 and 2 can then be recovered by cooling and, as necessary, by washing and adsorption or absorption.

One disadvantage of the known method and apparatus for fluidised bed pyrolysis lies in the fact that the fluidised bed only has limited stability and can easily be disrupted by foreign bodies, especially by the piece-form materials and the pulverisation products which are fed into the reactor for the purpose of pyrolysis. The shocks which are thereby exerted on the fluidised bed are particularly troublesome and make it impossible to carry out continuous working with high throughput. This disturbance manifests itself very strongly if the pieces which are added to the reactor are comparatively large; it is then necessary to pulverise or comminute the added material sufficiently for the dimensions of the pieces to be small relative to the cross-section of the fluidised bed. This comminution of the pieces is costly, particularly in the case of tough materials such as old tires, rubber cable sleeves and the like. A further disadvantage of the known fluidised bed reactors is that the material of the fluidised bed quickly produces severe erosion of the part of the reactor which are subjected to its movement, so that either structural materials have to be used which are extremely resistant to wear and which are therefore very expensive or it has to be accepted that the reactor will have a short life.

Because of these disadvantages, the processing of pieces of synthetic or rubber materials by pyrolysis in fluidised beds has not been carried out in practice, although fluidised bed pyrolysis in principle has important basic advantages with respect to working speed and controllability over other pyrolytic methods, such as the use of rotary kilns.

The present invention is based upon the purpose of providing a method of and apparatus for fluidised bed pyrolysis of pieces of rubber or like materials, in which the requirements which are decisive for practical utilisation of the method, namely high throughput, stable fluidised bed and adequate life for the apparatus, are fulfilled.

So far as the method is concerned, the invention achieves this purpose by a method for the pyrolysis of pieces of rubber or like material, particularly old vehicle tires, cable sleeves and the like, in which the material is fed into a hot fluidised bed and the pyrolysis products are withdrawn, wherein the hot fluidised bed is achieved by blowing a fluidising gas, which may be produced at least partially from gaseous pyrolysis products, into a fine-grained fluidised bed material, particularly sand, alumina and the like, and heating of the fluidised bed is achieved and maintained at a temperature sufficient for the pyrolysis, especially by combustion of gaseous pryrolysis products; this method is characterised by the fact that the fluidising gas is blown in from above into a bed material which has a particle size of less than 1 mm.

So far as the apparatus is concerned, the invention achieves the purpose with a fluidised bed reactor for the pyrolysis of pieces of rubber or the like, especially old tires, the reactor comprising a container at the lower part of which there is discharge device for non-volatile pyrolysis products; gas blowing nozzles arranged in a zone above the discharge device for supplying a fluidising gas and for producing a fluidised bed from material such as sand or alumina added to the reactor; preferably a heating device, especially one comprising heating tubes extending across the container; a gas outlet disposed in the zone above the fluidised bed; and supply means for conveying pieces of material to be pyrolised to the container; this apparatus is characterised by the fact that the gas blowing nozzles are arranged to direct the gas downwardly, that at least one group of nozzles are arranged in a common horizontal plane, and that the material supply device is such that its dimensions are comparable with the cross-sectional surface of the fluidised bed.

It has been shown somewhat surprisingly that by the use of a gas flow technique in which the fluidised bed material is not fluidised from below as previously, as for example from the bottom of the reactor vessel, but is fluidised from above by passing tubes into the bed from above, the shock effect is very largely overcome and the bed is substantially unaffected by the size of the pieces being added to it and by changes in the viscosity of the system, as may be produced by the production of the products of decomposition. Thus, with the method of the present invention, pieces can be fed in having a size which is comparable with the cross-section of the fluidised bed. Thus, for example, with a fluidised bed of only 35 cm. diameter, individual pieces of up to 3 kg. in weight can be fluidised and burnt, and with a fluidised bed of approximately 2 m² in cross-section three whole automobile tires can be simultaneously fluidised. The apparatus of the present invention can therefore be installed with a size of reactor vessel appropriate to receive only coarsely comminuted tires or even completely whole tires. The saving in pulverisation costs (which at the present time in West Germany amount to about DM 35 per tonne) which can be achieved in the processing of tires in accordance with the present invention is very considerable and is decisive for the practical utilisation and economical operation of the pyrolytic processing of tires. Added to this, there is of course the important technical advantage that whole tires can be much more easily transported and fed into the reactor.

It has also been found, with the present invention, that the wear on the reactor by the eroding action of the fluidised material is surprisingly small. According to current knowledge, this can be traced back to the fact that with the use of very small granular size material for the fluidised bed in accordance with the present invention the individual fine grains become rapidly and completely coated with a layer of pyrolsis products, particularly carbon such as carbon black, graphite and the like, which reduces the wear, and the grains have a very small momentum.

In putting the method of the present invention into effect, it is above all important that the direction of delivery of the fluidising gas into the fluidising layer should be downwards. In many cases, in order to achieve uniformity of the fluidised layer thereby produced, it may be preferable to provide a plurality of gas delivery nozzles or fluidising positions in a common horizontal plane distributed over the cross-section of the fluidised bed.

The downwardly-directed flow of the fluidising gas has the effect that a cavity, continuously changing in shape, is created within the fluidised medium (fluidised bed material and pyrolysis products), and in this cavity the gas stream is always being broken up by fluidised material tumbling into the cavity. This creates numerous individual gas clouds or gas bubbles which results in a comparatively peaceful simmering of the fluidised layer, particularly if the pressure drops in the fluidising gas supply pipes is greater than the pressure drop in the fluidizing layer at the point of fluidisation. This behaviour of the fluidised layer in the pyrolysis in accordance with the present invention is in marked contrast to the behaviour of the fluidised layer in conventional methods, in which the fluidising gas is introduced into the fluidising layer in an upward direction and then flows out into the fluidised material to form an upwardly enlarging cone and thus to produce giant bubbles and eruptions of gas, as a result of which a large part of the fluidising gas which is introduced into the bed for the purpose of fluidisation is lost.

It has further been established that in the pyrolysis in accordance with the present invention the composition of the pyrolytic products produced (the so-called product spectrum) can be changed within comparatively wide limits, particularly by varying the temperature of pyrolysis or the type and amount of fluidising gas, without the stability of the fluidised layer being adversely affected. Thus, for example, it is possible to control the method of the present invention so that the gaseous pyrolytic products contain a comparatively high proportion of aromatic compounds, these being well known to be particularly valuable as chemical raw materials.

Figure 2:
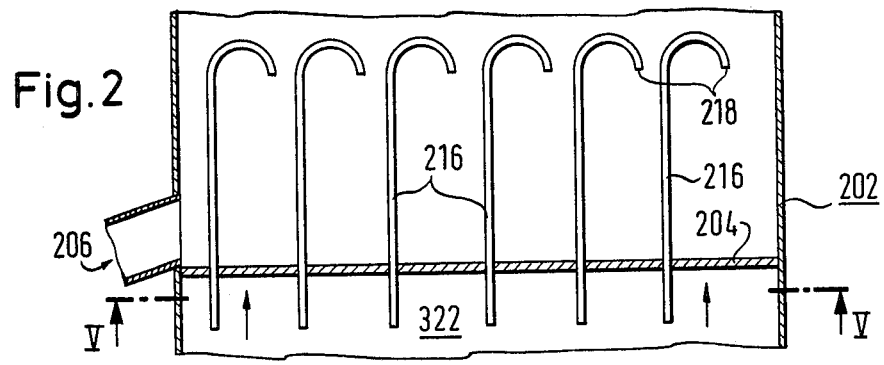
Figure 3:
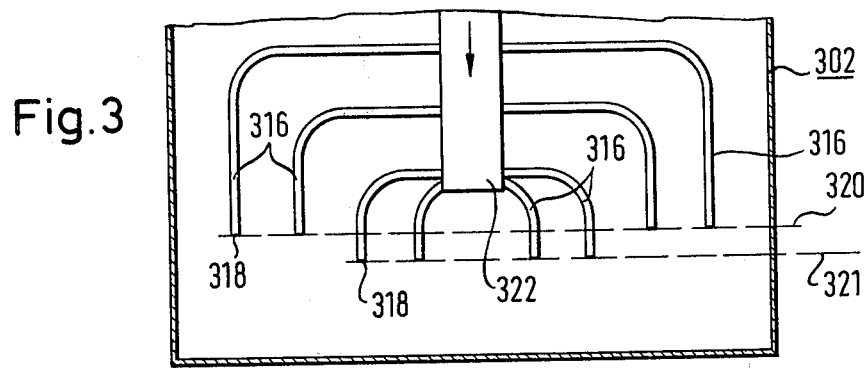
Figure 4:
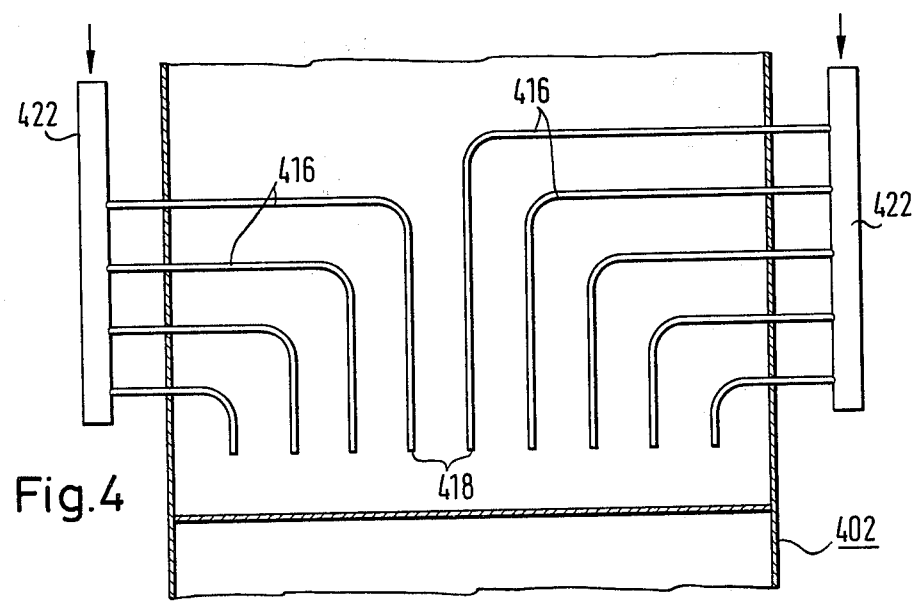
Figure 5:
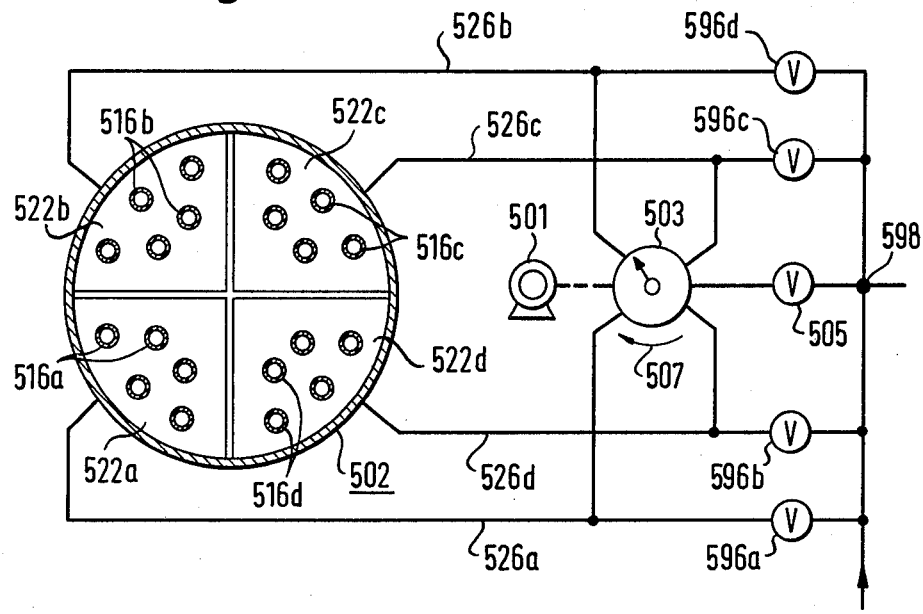
Figure 6:
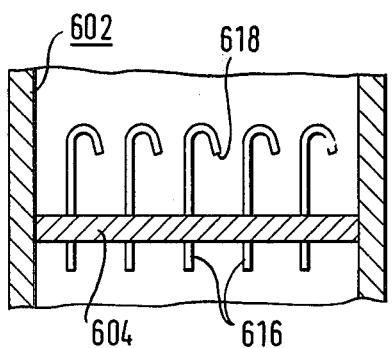
Figure 7:
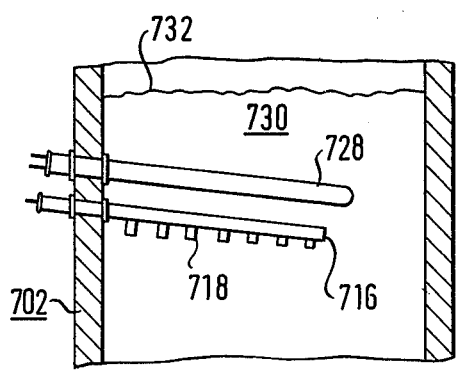

The invention is described below in relation to preferred embodiments shown in the accompanying drawings, which show:

FIG. 1—a diagrammatic representation, partly in the nature of a flow diagram, of an apparatus according to the invention;

FIG. 2—a diagrammatic representation of a modified embodiment of the fluidised bed as compared with FIG. 1;

FIG. 3—a diagrammatic representation similar to FIG. 2 of another embodiment of the inlet tubes for the fluidising gas;

FIG. 4—a diagrammatic representation similar to FIG. 3 of another form of inlet tubes for the fluidising gas;

FIG. 5—a diagrammatic underneath plan view, approximately in the direction of the arrows V—V of FIG. 2, of the fluidised bed of another embodiment with sector-like separately-supplied groups of fluidising gas inlet tubes;

FIG. 6—a diagrammatic representation similar to FIG. 2 of a further possible embodiment of the inlet tubes for the fluidising gas; and FIG. 7—a diagrammatic representation similar to FIG. 2 of a further possible embodiment of the inlet tubes and a special arrangement of heating tubes.

FIG. 1 shows, in a very diagrammatic representation in the form of a sectioned side view, a fluidised bed reactor for the pyrolysis of used vehicle tires, with a reactor container which in the embodiment illustrated consists essentially of an upright hollow cylinder. In its lower part, the reactor container 2 has an inclined base 4, the lowest part of which is connected to an outlet arrangement 6 for non-vapourisable pyrolysis products. In the embodiment illustrated, the outlet arrangement 6 has an outlet channel 8 in which two mutually-spaced gate valves 10 and 12 are provided, which are actuatable by respective setting motors 13 and 15 and form an outlet lock. A central supply tube 17 is mounted in the reactor container 2 by means of struts 14 and can be supplied with a fluidising gas from a supply line 24 and a connection 26. Inlet tubes 16 extend in star fashion from the supply tube 17. These lead to downwardly-directed blowing nozzles 18 which all lie in a common horizontal plane 20.

Heating tubes 28 are provided above the fluidising gas outlet plane 20 and extend transversely through the reactor container, operating mainly by radiant heating at the pyrolysis temperatures normally employed. These heating tubes can be heated in any desired manner, for example electrically. In general, heating with gas is preferred, as diagrammatically illustrated in FIG. 1. Further details of this are given below.

In the space above the base 4, a finely granular fluidised bed material (not shown) is disposed, which may simply be sand, with a particle size below 1 mm and preferably below 0.5 mm. Aluminium oxide powder or other similar granular fire-resistant and inert materials can be used as the fluidised bed material. In any special case of use, it can readily be ascertained by experiment whether an intended fluidised bed material is suitable. The body of fluidised bed material is operated as a fluidised layer 30, also called as fluidised bed, by means of the fluidised gas blown downwardly from the nozzles 18. The amounts of fluidised bed material and fluidising gas are so chosen that a dense and stable fluidised layer is given which extends upwardly approximately to a desired level 32. The height of the fluidised gas inlet plane 20 above the base 4 is so chosen that a rest zone 34 is formed on the base 4, at least at its lowest position close to the outlet arrangement 6, from which the material which collects, particularly solid, for instance metallic, pyrolysis products, can be removed.

In the upper part of the reactor container 2, spaced above the upper level 32 of the fluidised payer 30, a gas outlet 36 and a feed device 38 for supplying used tires 40 to be pyrolysed are provided. In the embodiment illustrated in FIG. 1, the feed device 38 is formed of a rotatable multi-chamber lock, which prevents the escape of gas through the feed device. A paddle wheel 44 rotatable about an axis 42 forms a feed hopper 52 with several chambers between its paddles 46 and stationary sealing walls 48,50, which chambers, on rotation of the paddle wheel 44 in the direction of the arrow 54, are emptied into the feed hopper 52 and are closed off to the outside by the following paddles 44. Since the tires 40 to be pyrolysed are not comminuted, they can readily roll around and are individually delivered through a feed opening 56 provided between the sealing walls 48, 50. Preferably, a device can suitably be provided (not shown) which pierces the tires before entry into the feed opening 56, so that any quantity of water present within the tires can run out before the tires enter the reaction container 2. As already stated, a particular advantage of the apparatus according to the invention lies in the fact that non-comminuted tires can be fed in, even with relatively small dimensions of the fluidised bed. For example, in a fluidised bed with a circular sectional surface of only about 2 m², three non-comminuted motor car tires can be simultaneously fluidised and pyrolysed. The cost of a preliminary comminution of the tires is thus saved and there is also the advantage that non-comminuted tires can be handled particularly easily.

Any gas enhancing or at least not inhibiting the pyrolysis reaction can be used as the fluidising gas, for example nitrogen (particularly for sparging the reactor container at the beginning of operation) or propane. It is particularly advantageous and simple if a part of the gaseous pyrolysis products are used as the fluidising gas, if necessary after a preliminary purification. Such a method of operation is known per se.

In operation, the desired fluidised bed is produced by introducing the fluidising gases into the connection 26. The bed is heated to the desired pyrolysis temperature by means of the heating tubes 28, in a case of pyrolysis of used tires, namely a temperature in the range from about 600° to 950° C., preferably from approximately 650° to 900° C. As soon as a tire 40 has fallen into the previously-heated fluidised bed, the surface of the tire begins to react with the fluidised material. The surface is thus strongly heated and parts of the surface come away, together with the adjacent fluidised material, so that new parts of the surface are exposed for further attack by the fluidised bed. The separated material introduced into the fluidised bed in this way increases the viscosity of the fluidised bed. At fluidised bed temperatures of 780° C., erosion of gaseous decomposition products (pryolysis gas) begins after about 20 seconds, which lasts for about 2 minutes and then fades away within about another 40 to 60 seconds. During this time, the composition of the pyrolysis gases changes only slightly. The metal parts from the tire carcasses fall in the fluidised bed and collect in and above the rest zone 34, from where they can be removed. Smoother operation can frequently be favoured by blowing in a small amount of gas by way of an upwardly-directed central auxiliary nozzle 35. It can be connected to the fluidising gas connection 26 via an inlet chamber 22 lying beneath the base 4 and a regulating valve 39.

The following Tables 1 and 2 give by way of example the analytically-determined compositions of gaseous and liquid pyrolysis products obtained in the treatment of used tires.

Table 1

| Product composition in percent by weight at different pyrolysis temperatures | | | |
|---|---|---|---|
| Temperature (° C.) | 640 | 740 | 840 |
| Fluidising medium | Offgas | Offgas | Offgas |
| Hydrogen | 0,46 | 0,78 | 1,35 |
| Methane | 5,05 | 10,20 | 12,21 |
| Ethylene | 1,71 | 2,58 | 2,10 |
| Ethane | 1,33 | 1,21 | 0,62 |
| Propane | 1,69 | 0,73 | 0,17 |
| iso-Butene | 0,83 | 0,18 | — |
| 1,3-Butadiene | 0,49 | 0,26 | 0,07 |
| 2-Butene | 0,53 | 0,09 | — |
| Isoprene | 0,95 | 0,12 | 0,05 |
| Cyclopentadiene | 0,30 | 0,08 | 0,10 |
| Benzene | 1,42 | 4,22 | 5,90 |
| Toluene | 1,97 | 3,81 | 3,29 |
| Xylenes + ethylbenzene | 2,32 | 1,93 | 1,09 |
| Styrene | 2,04 | 2,34 | 2,32 |
| Indene | 0,49 | 0,78 | 0,98 |
| Naphthaline | 0,14 | 0,90 | 1,86 |
| Methylnaphthaline | 0,38 | 0,68 | 0,90 |
| Diphenyl | 0,40 | 0,34 | 0,41 |
| Acenaphthyls | — | 0,15 | 0,35 |
| Fluorene | — | 0,11 | 0,11 |
| Phenanthrene | — | 0,08 | 0,28 |
| Carbon | 38,12 | 42,80 | 45,45 |
| Fillers | 7,24 | 7,85 | 7,08 |
| Water | 0,82 | 0,35 | 1,20 |
| Acid gases (as $H_2S$) | 0,45 | 1,55 | 0,73 |
| $C_1-C_4 + H_2$ | 12,09 | 16,03 | 16,52 |
| Pyrolysis Oils | 39,70 | 30,18 | 26,29 |
| Total | 98,42 | 98,76 | 97,27 |
| Proportion not determined by gas chromatography (without C) | 12,59 | 9,64 | 5,89 |

Table 2

| Composition of a gaseous fluid pyrolysis products in dependence upon the time after introduction of the material to be pyrolysed (used tires) into the fluidised layer | | |
|---|---|---|
| | | Sample taken after 3.5 min. (end of |
| | 1.5 min. | reaction) |
| Temperature | 780° C. | |
| % B W | | |
| Hydrogen | 1,4 | 3,5 |
| Methane | 20,2 | 22,1 |
| Ethylene | 18,0 | 19,9 |
| Ethane | 4,2 | 5,7 |
| Propene | 6,9 | 11,1 |

Table 2-continued

Composition of a gaseous fluid pyrolysis products in dependence upon the time after introduction of the material to be pyrolysed (used tires) into the fluidised layer

|  | 1.5 min. | Sample taken after 3.5 min. (end of reaction) |
|---|---|---|
| Temperature |  | 780° C. |
| 1,3-Butadiene | 2,7 | 5,3 |
| Higher aliphatics | 5,1 | 5,5 |
| Benzene | 18,3 | 11,5 |
| Toluene | 12,0 | 7,9 |
| Xylene and ethylbenzene | 2,9 | 3,1 |
| Styrene | 3,8 | 3,1 |
| Naphthaline | 2,1 | 0,8 |
| Higher aromatics | 2,4 | 0,5 |

The gases evolved from the fluidised layer 30 can be treated in known manner, see for example the publications in "Angewandte Chemie" 88 (1976), 737, and "Chemie-Ingenieur-Technik" 46 (1974), 579. In FIG. 1, only the basic operative steps are indicated. The pyrolysis gases are taken off from the gas outlet 36 and passed through a hot cyclone 58 in which carbon black, zinc oxide and other entrained solid particles are separated out. These solids can then be removed via a cyclone outlet 60. In operation according to the invention, it has proved a particular advantage that the fillers contained in the tires, particularly carbon black, can be recycled in approximately the same state of sub-division as that in which they were incorporated into the tires. Thus for example, the carbon black obtained from the cyclone 58 has a particle size on average of about 10 micrometers. This is about the same fineness as in the tires.

The pyrolysis gases evolved from the solids pass via a cyclone outlet duct 62 still in the hot state to a cooler 68, with a cooling water supply line 64 and a cooling water take-off line 66, in which condensable constituents are separated off. These can be removed from an outlet 70. The cooled gas freed from condensable constituents then passes via a line 72 to a scrubber 74 in which water-soluble components of the gases are removed with a wash water (or if required, other scrubbing solutions). The solution obtained can then be withdrawn via an outlet 78. The cooled and washed gas then passes via a line 80 to a compressor 82, in which it is compressed to about 2 to 3 bars and is then passed via a lock-valve 82 and a back-pressure valve 86 to a gas-holder 88. The pyrolysis gas stored therein can be removed via an outlet 90 and a valve 91 for further use. Moreover, an over-pressure safety valve 92 is incorporated in the outlet 90. The fluidising gas connection 26 and the heating tubes are also supplied from the gas-holder 88. For this purpose, the fluidising gas connection 26 can be supplied via a pre-heater 94 and a valve 96 connected at a supply point 98 which is supplied via a valve 100 from the outlet of the gas-holder 88. Moreover, the supply point 98 is connected via a valve 102 with a gas-holder 104 which contains a supply of a suitable auxiliary gas, in the simplest case nitrogen, which can be used as the fluidising gas in the initial phase of the reactor operation if insufficient pyrolysis gas has been formed at that time. The heating tubes 28 are heated with a combustible mixture of pyrolysis gas (or a combustible auxiliary gas) and air. In FIG. 1, only one supply connection 106 and one take-off connection 108 for the heating tubes 28 are indicated diagrammatically. The supply connection 106, in which combustion air from a venturi tube 110 is admixed in the usual fashion, is connected via a valve 112 to a combustion gas supply point 114, which in turn can be supplied likewise via a valve 116 from the outlet 90 of the gas-holder 88 as also (in the initial phase of operation) via a valve 118 from a gas-holder 105. The hot combustion off-gas passes from the take-off connection 108 of the heating tubes 28 through the pre-heater 94 to an outlet 120. The off-gas heats the fluidising gas in this way. The apparatus can also include further valves, measuring and regulating devices and it can be provided with the devices described in other ways (for example, the valves 100, 102 as well as 116 and 118 can also be provided as regulating valves). Such further and other possibilities which do not modify the essence of the invention are not described in further detail.

In operation, the reactor is first set in operation with auxiliary gas, preferably nitrogen, from the gas-holder 104. The heating tubes are separately supplied with propane. As soon as the desired pyrolysis temperature has been attained, the material to be pyrolysed (used tires 40) is supplied and, as soon as sufficient pyrolysis gas has been developed, the supply to the fluidising gas connection 26 and the heating tube 28 is taken from the gas-holder 104 via the gas-holder 88. From time to time, the solid pyrolysis products collecting in the rest zone 34 are discharged via the outlet lock 12 into the outlet 6.

FIG. 2 shows diagrammatically an embodiment of a reactor container 202 with a horizontal base 204, an outlet device 206 and U-shaped curved inlet tubes 216 which are supplied from a feed chamber 322 located beneath the base 204. The blowing nozzles 218 lie in a horizontal plane. Such a mode of construction with a horizontal base is simpler to manufacture. It is particularly useful where there is a large amount of heavy solid pyrolysis products.

FIG. 3 shows, in a similar fashion to FIG. 2, the possibility in which the fluidising gas is supplied from above via a central tubular fluidising gas inlet chamber 322 into a reactor container 302 and is blown into the fluidised bed via a star-shaped inlet pipe 316 with downwardly-directed nozzles 318. An outer group of nozzles lies in a first horizontal plane 320 and an inner group in a lower and second horizontal plane 321.

FIG. 4 shows a similar illustration to FIG. 2 of an embodiment in which angled tubes are used as the gas inlet pipes 416, which are inserted through the wall of the reactor container 402 and are supplied outside the reactor container 402 from common fluidising gas inlet chambers or ducts 422. The angled tubes end within the container in vertical end sections with downwardly-directed nozzles 418 which lie in the fluidised bed in a horizontal plane.

In operation, the various embodiments of the inlet tubes behave substantially similarly. In order to achieve the most satisfactory fluidisation, it can be suitable to provide each group of outlet nozzles in several different horizontal planes. Normally, however, a single group in one horizontal plane is sufficient, as illustrated.

In order that the fluidised bed is traversed uniformly by the fluidising gas, it is suitable to provide equal flow resistances in the fluidising gas inlet tubes. If several groups of nozzles are arranged in several horizontal planes, it can also be suitable to select somewhat different flow resistances from one group to another group, in order to achieve a desired flow pattern. It is particularly advantageous for the stability of the fluidised bed and its non-sensitivity to the supply of foreign materials if the pressure drop in the inlet tubes is comparable with the pressure drop in the fluidised bed at the fluidising point and preferably is about one to ten times as large as the pressure drop in the fluidised bed.

FIG. 5 shows an embodiment in which a reactor container 502 is formed similarly to that of the embodiment of FIG. 2. The fluidising gas inlet chamber located in the lower region of the container 502 is sub-divided into several sectors (in FIG. 5, four sectors) 522 a, b, c and d, which can be supplied via separate lines 526 a, b, c and d and regulatable valves 596 a, b, c and d from a common fluidised gas supply point 598. In each sector, a group of inlet tubes 516 a, b, c and d is provided which each actuate the corresponding part section of the fluidised bed. These part sections (sectors) correspond to successive circumferential regions of the reactor container 502. By regulation of the valves 596 a, b, c and d, the sectors can thus be operated individually with more or less fluidising gas and thus the configuration of the fluidised bed can be controlled. A particularly intensive intermixing of the fluidised bed materials and the pyrolysis products located therein can be produced very simply by subjecting the fluidised bed to a rotary movement. This can be effected particularly readily with the embodiment according to FIG. 5, by supplying the various groups of inlet tubes with pressure pulses in a cyclic sequence. In the simplest case, this can be achieved by briefly further opening the adjustable valves 596 a, b, c and d in a cyclic sequence. This process can be carried out with the aid of an automatic control device. For this purpose, according to FIG. 5, a four-way valve 503 rotatable by a motor 501 is provided, whose inlet is connected via a regulating valve 505 with the fluidising gas supply point 598 and whose four outlets are coupled to the fluidising gas connections 526 a, b, c and d. It will be readily recognised that on rotation of the four-way valve 503 in the direction of the arrow 507, the connections 526 a, b, c and d are supplied with pressure pulses in a cyclic sequence.

The entire number of inlet tubes can also be sub-divided into smaller groups, which in the limiting case can each consist of three or two tubes or even a number of individual inlet tubes.

FIG. 6 illustrates a further possibility of enhancing or initiating a rotary movement of the fluidised bed. The output nozzles 618 for the fluidising gas are arranged with a component of the blowing direction in the circumferential direction of the reactor container 602. In the simplest case, the output direction can be slightly inclined to the vertical (container wall 602). This is readily achieved according to FIG. 6 in that the inlet pipe 616 arranged in the base 604 of the reactor container 602 is constructed similarly to FIG. 1, but with upwardly bent end sections which are slightly inclined to the vertical in the desired direction of rotation.

Other embodiments are possible without exceeding the scope of the invention. In particular, it is possible instead of indirect heating by means of the heating tubes 28 to use partially or completely direct heating. Combustion air is thus blown into the fluidised bed and in and above the fluidised bed a partial combustion of the pyrolysis products is maintained to such an extent that the desired pyrolysis temperature is maintained.

FIG. 7 illustrates in a similar manner to FIG. 2 an embodiment in which, below the effective upper limit or level 732 of the fluidised bed 730, several heating tubes 728 project inwardly and downwardly into the reactor container 702, preferably by an amount up to about ⅔ of the diameter of the reactor container. Beneath the heating tubes 728, inlet pipes 716 are inserted which in a similar way are inclined downwardly in the reactor container 702. The inlet pipes 716 have downwardly-directed nozzles 718 which lie in a horizontal plane. Instead, the nozzles can also be arranged in a plane which is slightly inclined inwardly towards the interior of the reactor. The inclination of this plane need not be the same as the inclination of the heating tubes or the inlet pipes. The inclined arrangement of these pipes facilitates downward movement of particulate or powder-like non-pyrolysable constituents of the material to be pyrolysed.

We claim:

1. A fluidized bed reactor for the pyrolysis of pieces of material of rubber and the like, comprising a reactor container which includes a bottom associated with an outlet arrangement for non-vaporizable pyrolysis products, said bottom and said outlet arrangement being arranged in a lower part of the container, an arrangement of blowing orifices for introducing fluidizing gas and producing a fluidized bed from a filled-in fire-resistant and inert finely granular fluidized bed material, said blowing orifices being arranged in a region above the bottom with a downward blowing direction, at least on group of the blowing orifices being arranged in a common horizontal plane, a gas outlet, and a feeding device for introducing pieces of material to be pyrolyzed, said inert fluidized bed material having a particle size below 1 mm, said gas outlet and said feeding device being arranged in an upper part of the container, and said feeding device and fluidized bed being dimensioned for the introduction and pyrolysis of pieces having the size of whole automobile tires.

2. Apparatus according to claim 1, in which the feed device handles non-comminuted used tires.

3. Apparatus according to claim 1, characterized in that the feed device is provided as a multi-chamber hopper in order to prevent the escape of pyrolysis products.

4. Apparatus according to claim 1, characterized in that the blowing orifices are provided on U-shaped, downwardly-directed inlet pipes led downwardly into the reactor container.

5. Apparatus according to claim 1, characterized in that the blowing orifices are provided on inlet pipes led from above into the reactor container.

6. Apparatus according to claim 1, characterized in that the blowing orifices are provided on inlet pipes extending laterally into the reactor container.

7. Apparatus according to claim 1, characterized in that all the blowing orifices are arranged in a common horizontal plane.

8. Apparatus according to claim 1, characterized in that substantially horizontally arranged heating tubes are provided above the common horizontal plane.

9. Appparatus according to claim 1, characterized in that the blowing orifices are connected in groups each of which serves to supply a part section of the fluidized bed and is connected to a supply line common to all orifices of the group.

10. Apparatus according to claim 9, characterized in that the part sections correspond to successive peripheral sections of the reactor container.

11. Apparatus according to claim 9, characterized in that the supply lines are connected to control devices for cyclically successive introduction of gas pulses.

12. Apparatus according to claim 1, characterized in that the blowing orifices are arranged with a component of the blowing direction lying in the peripheral direction of the reactor container.

13. Apparatus according to claim 1, characterized in that the blowing orifices are adapted to be supplied at least partly from the gas outlet.

14. Apparatus according to claim 13, characterized in that a condenser is provided between the gas outlet and the blowing orifices.

15. Apparatus according to claim 1, characterized in that a reset zone is provided between the common horizontal plane and an inclined bottom arranged therebelow, at least at the lowest position of the bottom, and that the outlet arrangement is connected to the rest zone.

16. Apparatus according to claim 13, characterized in that the heating tubes are heatable with heating gas taken from the gas outlet.

17. Apparatus according to claim 1, characterized in that the reactor container is provided with heating means.

18. Apparatus according to claim 1, characterized in that said fluidized bed material has a particle size of below 0.5 mm.

19. Apparatus according to claim 1, characterized in that the fluidized bed material comprises aluminum oxide.

20. Apparatus according to claim 1, characterized in that the fluidized bed material comprises sand.

* * * * *